(No Model.)
C. THOMAS.
CHUCK FOR WATCH MAKERS' LATHES.
No. 300,032. Patented June 10, 1884.
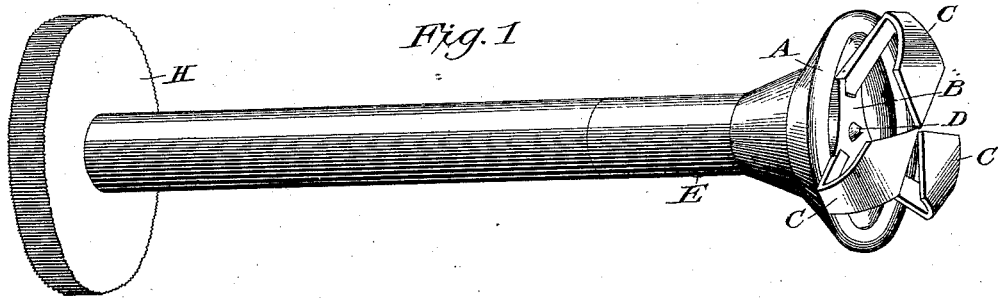
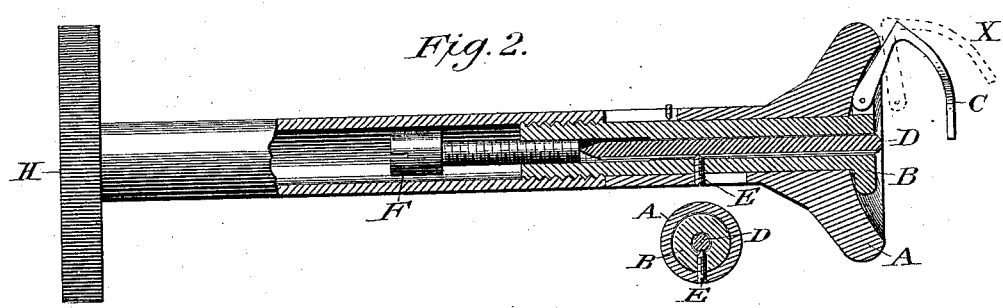
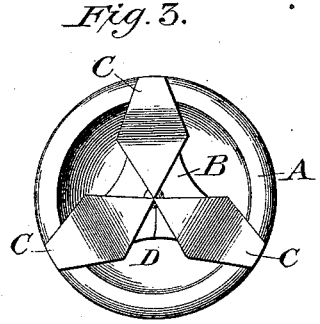
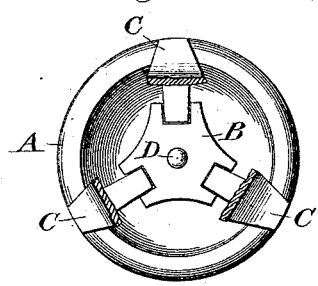
Witnesses:
Wilmot Moore
B. W. Koopman
Inventor:
Cal Thomas

UNITED STATES PATENT OFFICE.

CAL THOMAS, OF TERRE HAUTE, INDIANA.

CHUCK FOR WATCH-MAKERS' LATHES.

SPECIFICATION forming part of Letters Patent No. 300,032, dated June 10, 1884.

Application filed December 26, 1883. (No model.)

*To all whom it may concern:*

Be it known that I, CAL THOMAS, a citizen of the United States, and a resident of the city of Terre Haute, county of Vigo, and State of Indiana, have invented a new and useful Chuck for Watch-Makers' Lathes, of which the following is a specification, viz:

My invention relates to improvements in lathe-chucks in which clamping-jaws operate in conjunction with a back or pump center; and the objects of my improvements are, first, to provide a revolving dead-center adjustable to any size of work; secondly, to afford facilities for the proper adjustment of the back-center, so as to hold the work to the jaws; and, thirdly, to draw the clamping-jaws tight, so as to hold the work rigidly. I attain these objects by the mechanism illustrated in the accompanying drawings, in which—

Figure 1 is a view of the entire chuck. Fig. 2 is a section showing one of the three jaws and body of chuck. Fig. 3 shows end view, jaws closed; and Fig. 4 shows front end view, jaws open.

Similar letters refer to similar parts throughout the several views.

In constructing this type of chuck I provide a shell or sleeve, A, countersunk, as shown in Fig. 2, through which passes a hollow spindle, B, to the front end of which is jointed the three clamping-jaws C C C, and through this hollow spindle B is the pump or dead revolving center D, with a guide pin or screw, E, and a thumb-screw, F, at back end, to adjust to position.

In making provision for holding the work in the chuck I place the hollow spindle B high enough to let the clamping-jaws C C C open to receive it, as shown by dotted lines X. Then the draw-in screw H tightens the work.

The operation of the jaws C C C, as they open back, is shown by dotted lines X at the large or concave end of tubular sleeve A. When thus opened, space is given to drop in a watch-wheel, and the jaws are then closed over it and clamp the staff or pinion, holding it rigidly in a true center while revolving.

Having thus described my invention, what I claim, and desire to secure by Letters Patent, is—

The combination of the hollow draw-in screw H, the sleeve A, countersunk at its outer end, the hollow spindle B, having hinged to its outer end the clamping-jaws C, and threaded at its inner end, the pump-center D, the adjusting-screw F, and guide-pin E, substantially as described.

CAL THOMAS.

Witnesses:
R. G. JENCKES,
HORACE B. JONES.